US006285098B1

(12) United States Patent
Nestler et al.

(10) Patent No.: US 6,285,098 B1
(45) Date of Patent: Sep. 4, 2001

(54) LINEAR DRIVE

(75) Inventors: Rainer Nestler, Marienberg; Jan Konvicka; Frank Wieland, both of Chemnitz, all of (DE)

(73) Assignee: Fraunhofer-Gesellschaft zur Forderung der angewandten Forderung e.V., Munich (DE)

( * ) Notice: Subject to any disclaimer, the term of this patent is extended or adjusted under 35 U.S.C. 154(b) by 0 days.

(21) Appl. No.: 09/633,624

(22) Filed: Aug. 7, 2000

Related U.S. Application Data

(63) Continuation of application No. PCT/EP98/07147, filed on Nov. 9, 1998.

(30) Foreign Application Priority Data

Feb. 18, 1998 (DE) .............................................. 198 06 832

(51) Int. Cl.[7] .................................................. H02K 41/00
(52) U.S. Cl. ........................... 310/12; 409/201; 409/216; 409/235; 901/41; 74/490.03
(58) Field of Search ................... 310/12, 13, 14; 409/132, 201, 216, 235; 408/1 R, 236; 901/22, 23, 41; 74/490.03

(56) References Cited

U.S. PATENT DOCUMENTS

| 3,579,001 | 5/1971 | Pelenc et al. | 310/13 |
|---|---|---|---|
| 4,247,794 | 1/1981 | Jooss et al. | 310/13 |
| 4,831,290 | 5/1989 | Clauss et al. | 310/12 |
| 5,401,128 | 3/1995 | Lindem et al. | 409/132 |
| 5,486,727 | 1/1996 | Heidelberg et al. | 310/12 |

FOREIGN PATENT DOCUMENTS

| 768146 | 4/1997 | (EP) . |
|---|---|---|
| 2194907 | 3/1988 | (GB) . |

OTHER PUBLICATIONS

Patent Abstracts of Japan, vol. 18, No. 320 (E–1563) of Jun. 17, 1994 & JP 06070534A of Mar. 11, 1994 (Yaskawa Electric Corp.).
Patent Abstracts of Japan, vol. 97, No. 10 of Oct. 31, 1997 & JP 09150334 of Jun. 10, 1997 (Toyodo Mach Works Ltd.).
Patent Abstracts of Japan, vol. 17, No. 675 (M–1526) of Dec. 13, 1993 & JP 05228761A of Sep. 7, 1993 (Canon Inc.).

Primary Examiner—Nestor Ramirez
Assistant Examiner—Judson H. Jones
(74) Attorney, Agent, or Firm—Laubscher & Laubscher

(57) ABSTRACT

A linear drive which is particularly suitable for drive axles of parallel structures such a hexapod arrays, comprises a carrier housing (5) and a carrier (4) that can be moved lengthwise in relation to said carrier housing, both the carrier housing and the carrier having provided thereon drive elements (11, 6) such as electrical coils or magnets. In order to achieve a highly dynamic drive performance, the carrier takes the form of a lightweight profiled body with an open cross-sectional profile. The drive elements (6, 11) on the carrier side and on the housing side, respectively, are preferably provided within the open areas of the cross-sectional profile.

12 Claims, 5 Drawing Sheets

LINEAR DRIVE

REFERENCE TO RELATED APPLICATION

This application is a continuation of the PCT Application No. PCT/EP98/07147 filed Nov. 9, 1998.

BACKGROUND OF THE INVENTION

The present invention relates to a linear drive comprising a carrier and a carrier housing on which the carrier is supported such that it is longitudinally movable, and drive elements provided on said carrier and said carrier housing and used for producing a relative movement between said carrier and said carrier housing.

BRIEF DESCRIPTION OF THE PRIOR ART

Such linear drives are primarily used in machine tools for producing a feed motion between a tool and a workpiece. In particular, such linear drives are used in the still young field of machine tools with parallel structures. Recently, in particular hexapod machine tools have become known in the case of which the actual machining module is supported on a machine frame via six struts of adjustable length. By purposefully varying the strut lengths, feed motions of the tool to the workpiece can be realized in all six spatial degrees of freedom, i.e. three translatory degrees of freedom and three rotational degrees of freedom. A machine tool of this type is known e.g. from US-A-5 401 128, which discloses linear drives of the type mentioned at the start for the struts.

Other hexapod structures are known from German patent applications P 196 36 100.1 and P 196 36 099.4 of the applicant of the present application.

Nowadays, modern machine tools have to fulfil high requirements on the force absorbing ability, feed and production accuracy and dynamic behaviour. Efficient control means suitable for realizing new machining strategies, such as high-speed machining processes or the production of complicated three-dimensional shapes, require, for optimum utilization, new drive concepts which can only be realized to a limited extent by conventional drive elements.

In the field of linear drives, for example, spindle drives have been known for a long time whose performance is, however, limited by the conversion of a rotary movement into a linear movement. The direct linear drives which have been used up to now for moving machine tool tables or carriages can, due to their voluminous structural design, only be used to a limited extent for the above-mentioned machining strategies.

Also the electric linear motor, which is known from U.S. Pat. No. 5,401,128 and which is there used as a hexapod machine tool strut of adjustable length, is in need of improvement, especially as far as its dynamic behaviour is concerned.

SUMMARY OF THE INVENTION

It is therefore the object of the present invention to provide a hexapod machine tool equipped with a compact, stiff strutting structure and relative length adjustment for the struts, which is particularly suitable for use as a high-speed machine tool.

This permits the realization of a particularly light but still stiff structure allowing, due to its small mass, high accelerations and decelerations and increasing therefore the maximum possible production speed and production accuracy in comparison with the hitherto known hexapod machine tool.

In addition, the length adjustment structure of the struts with a respective linear drive can now also be implemented as an extremely slender component so that there will be a greater freedom of design for arranging a plurality of linear drives, a fact which is of interest in the area of the machining module in particular in the case of comparatively small hexapod machine tools.

The drive elements of the linear drive, i.e. the respective magnets and coils, are provided on the carrier side on inner surfaces of the carrier in a particularly space-saving manner.

For optimally compensating the forces and moments acting on the carrier due to the drive elements and for improving the running properties of the carrier in its support on the housing, the drive elements of the carrier are provided in pairs and arranged on respective opposed surfaces of the carrier.

A particularly compact embodiment will be obtained when the drive elements, i.e. the respective coils and magnets of the carrier housing, are arranged within the open areas of the cross-sectional profile of the carrier in such a way that they fill almost the whole residual free space of the cross-sectional profile; sub-areas of these drive elements may definitely extend beyond the carrier. This also applies to structural designs in the case of which sub-areas areas of the drive elements of the carrier housing project into the open areas of the cross-sectional profile of the carrier.

In order to provide a carrier structure which is particularly light but, nevertheless, very stiff, the carrier comprises two U-shaped profiled bodies which are arranged such that their bottom sides face each other. Between these bottom sides a lightweight supporting element is arranged in the central area of the carrier, i.e. in the region of the smallest areal moments of inertia, said lightweight supporting element being provided with a plurality of empty spaces, through holes or openings.

BRIEF DESCRIPTION OF THE DRAWINGS

For explaining the present invention, examples of said invention will now be described on the basis of embodiments shown in the drawing, in which:

FIG. 5 shows three different embodiments of the cross-section of the carrier including the arrangement of the carrier drive elements and of the drive elements on the side of the carrier housing.

DETAILED DESCRIPTION

Figure 1:
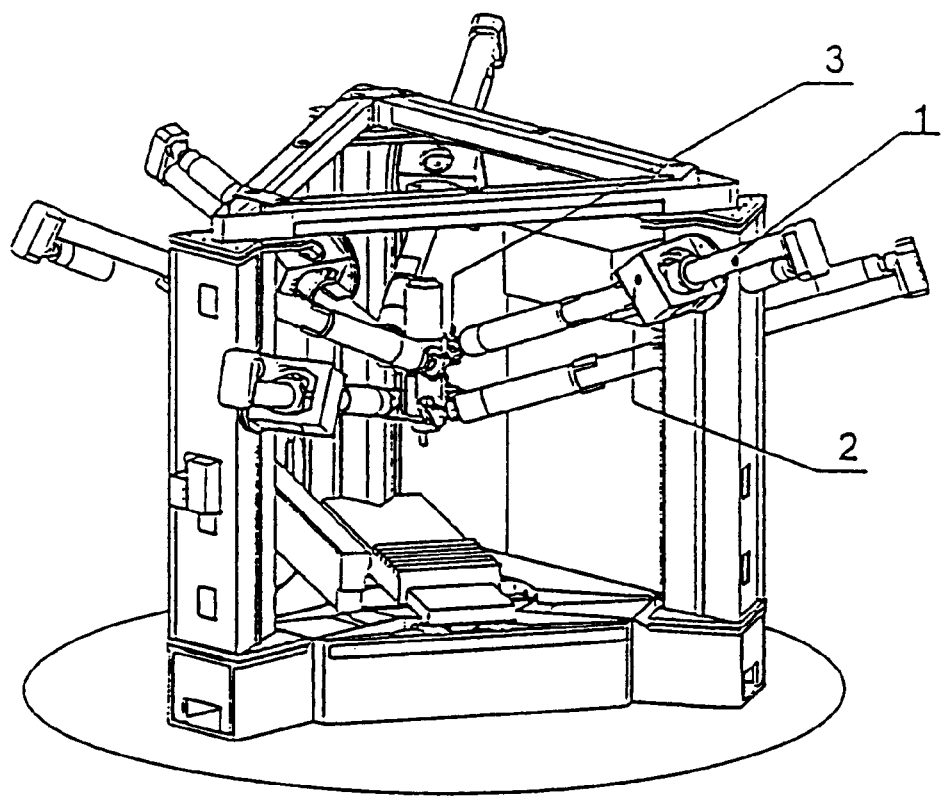
FIG. 1 shows a hexapod machine tool with six linear drives.

FIG. 1 shows a hexapod machine tool with six struts of adjustable length which are each implemented as an electric linear drive. The struts 1 are each coupled to an outer machine frame via a first joint 2 which is movable in all three rotational degrees of freedom. In addition, each strut is articulated on a machining module via a second joint 3 which is also rotatable in all three spatial degrees of freedom, said machining module being here a unit with a rotating spindle suitable e.g. for turning, milling and drilling. The articulation of the struts 1 is effected in two planes spaced from each other with respect to the axis of the spindle so as to impart a higher stiffness to the spindle shaft of the machining module. The likelihood of collisions between the individual struts will be reduced in this way as well.

In the following, the structural design of an individual one of these struts, which are implemented as linear drives, will be explained in detail on the basis of FIGS. 2 to 4.

The linear drive consists of a carrier 4 and an associated carrier housing 5 on which the carrier is supported such that it is movable along the longitudinal direction thereof. The carrier housing 5 has an essentially sleevelike, elongate shape encompassing the rodlike carrier and it has a substantially hexagonally shaped cross-sectional outer contour. In order to permit easy access to its interior, the carrier housing 5 is composed of a total of four plates having a prismatic cross-sectional profile and extending along the longitudinal direction of said carrier housing 5, the individual plates being screwed together.

The movable carrier 4 has a double T cross-sectional profile, which is schematically shown in FIG. 5. As can especially be seen from FIG. 4, this carrier 4 is composed of a plurality of subcomponents so as to realize, on the one hand, a sufficiently stiff structure which is capable of absorbing the forces occurring at the machining module without any impairing deformation and so as to provide, on the other hand, a structure having a low weight so that the masses to be moved are kept small and so as to guarantee a good dynamic behaviour of the linear drive. For this purpose, the carrier shown in FIG. 4 comprises two U-shaped, rodlike profiled bodies extending along the longitudinal axis of the carrier, said longitudinal axis extending perpendicularly in FIG. 4. Between the bottom sides of these profiled bodies a lightweight supporting element 7 is arranged, which comprises a plurality of openings between respective webs, said openings being especially shown in FIG. 3. The longitudinally extending edge portions of the lightweight element take the form of more sturdy strips.

In addition, projections of guide elements, which are attached to the outer surfaces of the carrier 4 and which are provided with suitable guide portions, protrude into the space between said bottom sides, the carrier resting on the carrier housing 5 via these guide portions. The guide elements 8 can also be provided directly on the thin-walled, latticed lightweight supporting element 7 on the edge strips thereof, whereby a higher precision can be achieved in comparison with separate guide rails attached with the aid of fastening means. Alternatively, the guide elements can be provided as separate parts and also integrally on the U-shaped profiled bodies.

The legs of the respective U profile are slightly different in length. The respective leg in FIG. 4 is slightly longer and extends into a longitudinal groove 20 provided on the inner housing wall.

Figure 2:
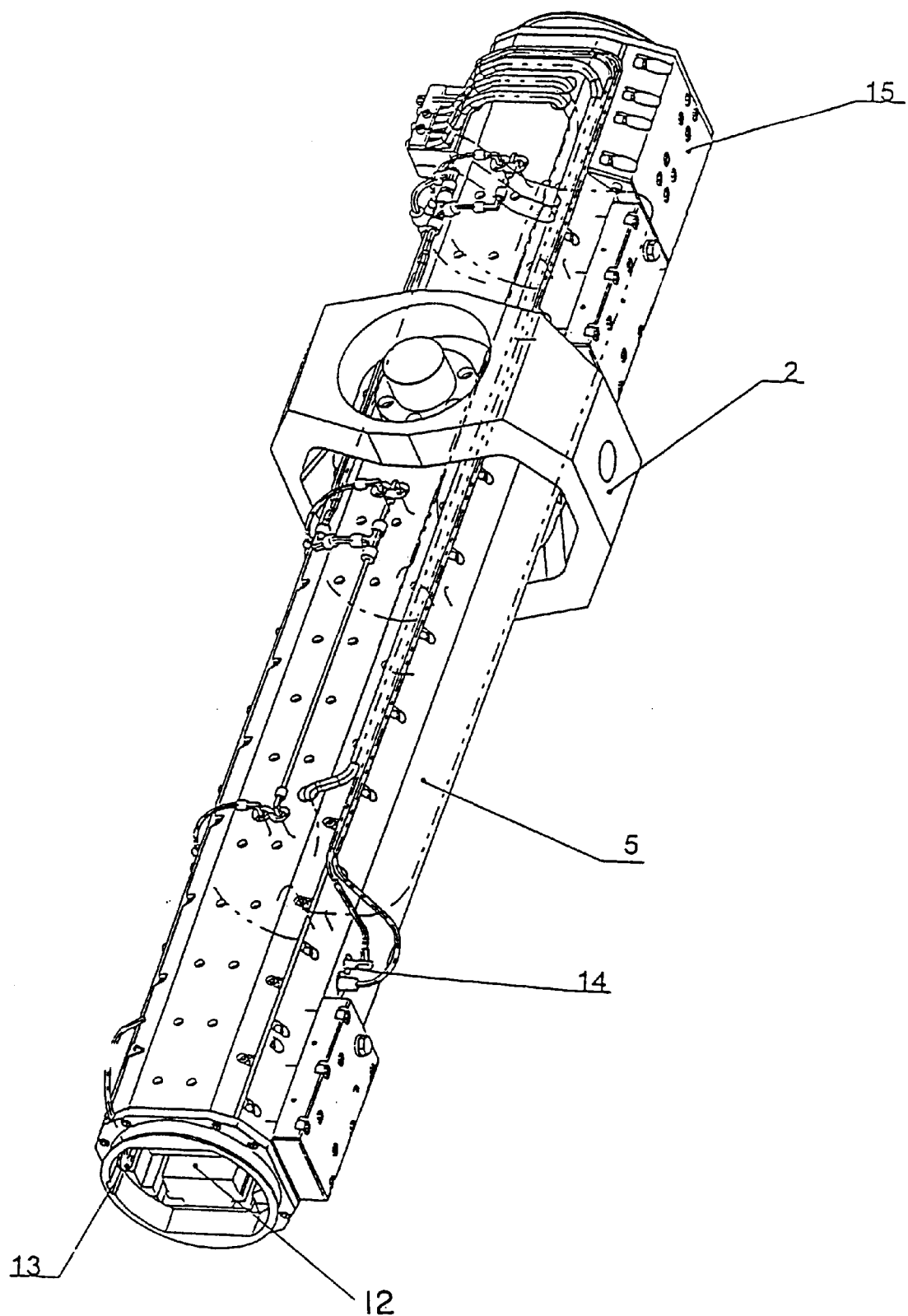
FIG. 2 shows an external view of a linear drive without the actual carrier.
Figure 3:
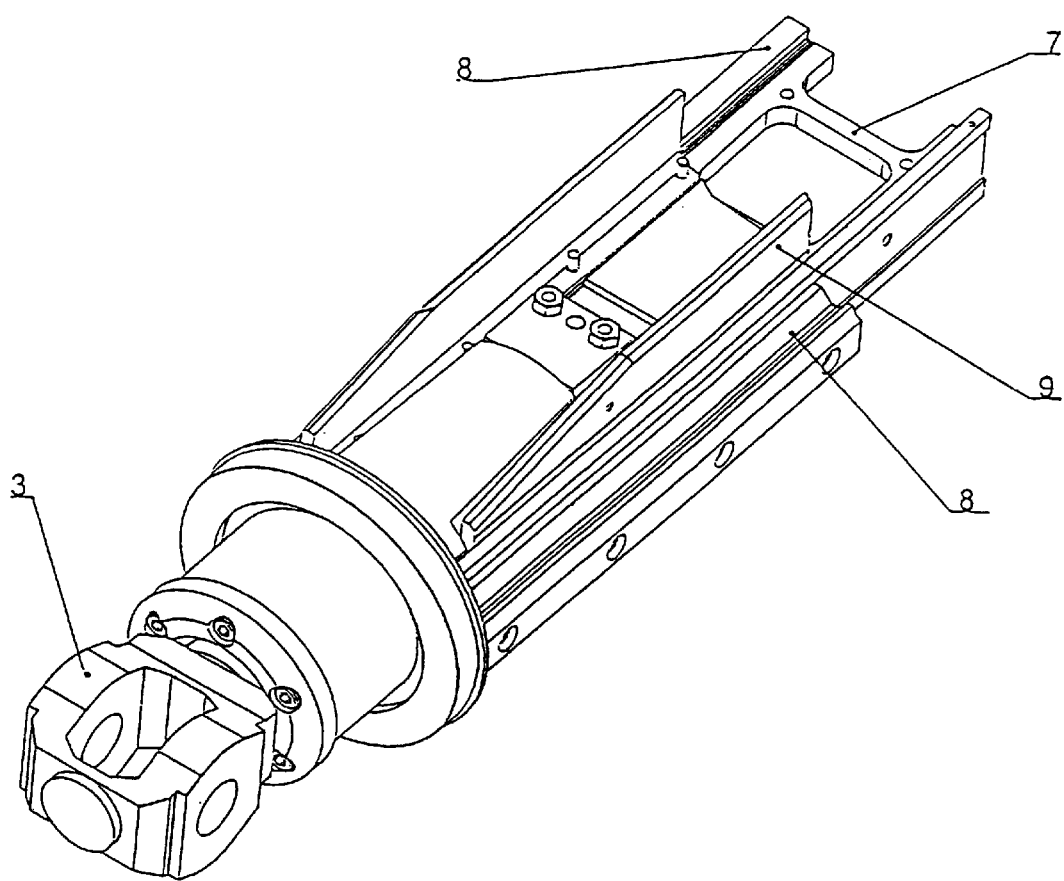
FIG. 3 shows a fragmentary view of a carrier of the linear drive shown in FIG. 2.
Figure 4:
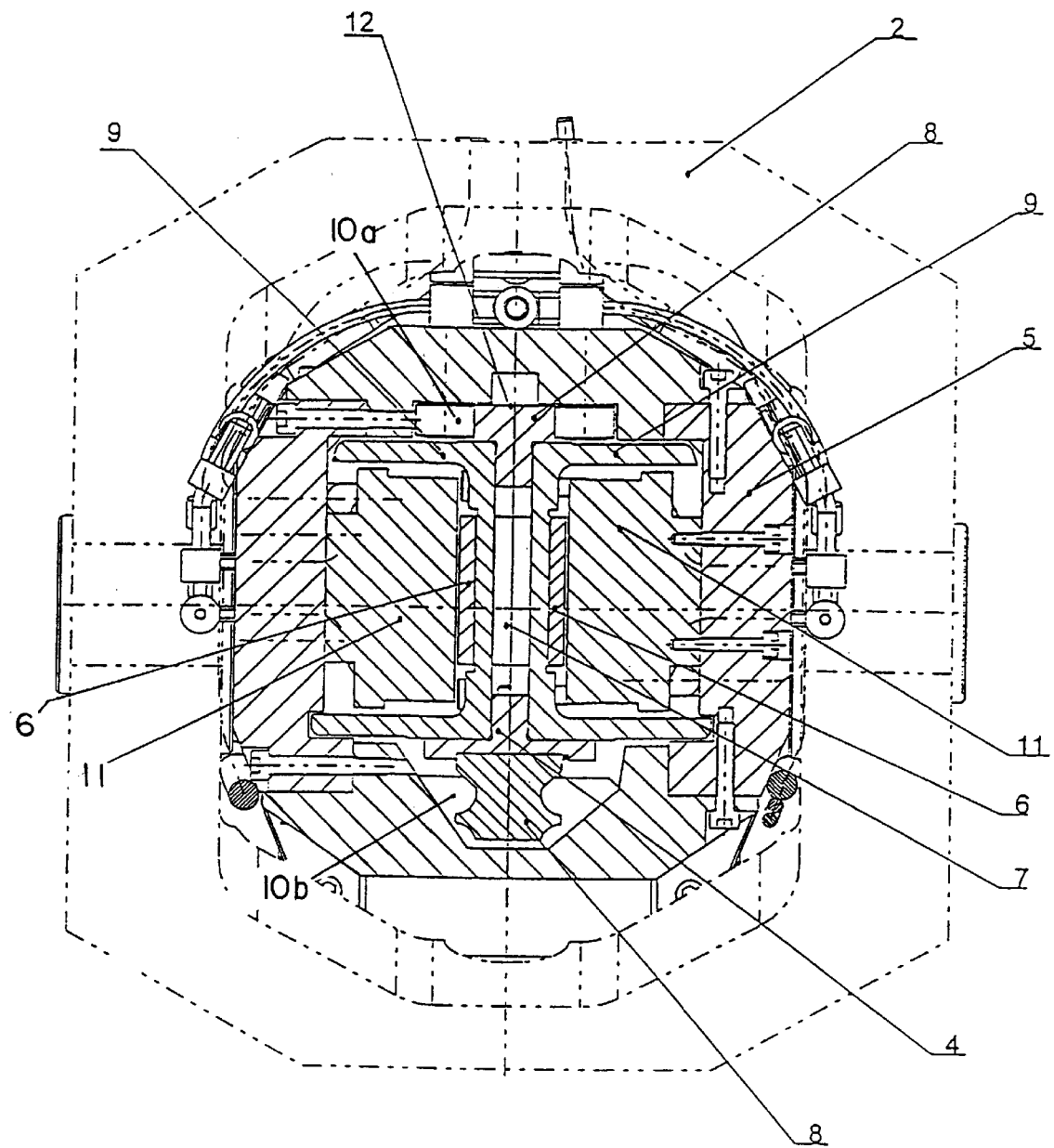
FIG. 4 shows a section transversely to the longitudinal axis of the linear drive shown in FIG. 2 including a section through the carrier of the linear drive.

In the embodiment shown in FIGS. 2 to 4, the guide elements 8 are arranged on the two opposed outer surfaces of the double T-section, one guide element being integrated in a fixed bearing between the carrier and the carrier housing, and said fixed bearing being provided with running surfaces for rollers 10a secured to the carrier housing 5. Instead of rollers, also other linear guide means with or without rolling elements can be provided. The bearing arranged on the opposite side is, however, implemented as a movable-bearing type guide 10b means so as to avoid strain caused by overdetermined forces in the guide elements. In the embodiment shown in FIG. 4, this movable bearing takes the form of a profiled slide rail. Alternatively to guide means on both sides, it is also possible to provide guide means on one side.

Figure 5A:
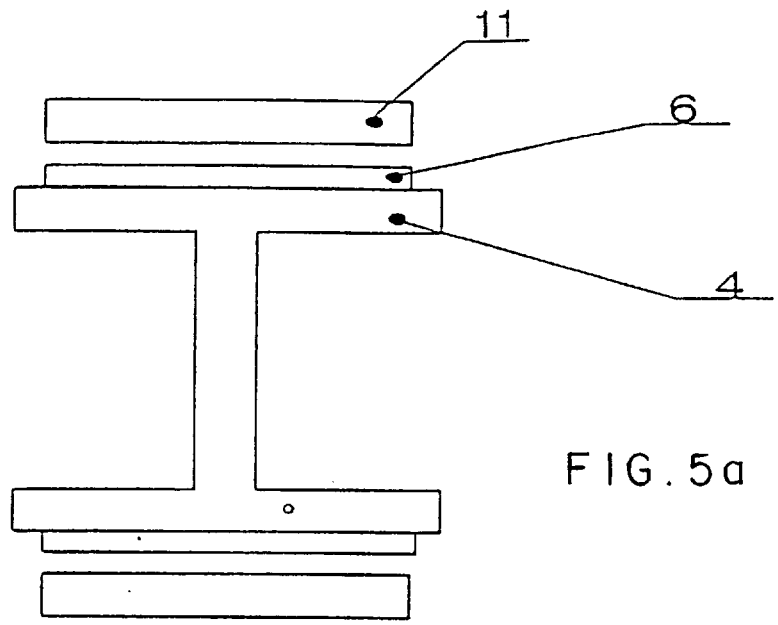
FIGS. 5*a*–5*c* illustrate three different embodiments of the cross-section of the carrier including the arrangement of the carrier drive elements of the drive elements on the side of the carrier housing.

For moving the carrier 4, which is adapted to be extended on both sides of the carrier housing 5, the carrier and the carrier housing have provided thereon drive elements such motor elements 6, 11, which are coils or magnets permitting a direct electric drive. Various embodiments of the arrangement of these drive elements 6, 11 are shown in FIG. 5a) to c). To begin with, the embodiment according to FIG. 5c) is explained in detail making reference to FIG. 4. The drive elements 6 on the carrier side are arranged in the area of the central web of the double T cross-section, to be exact in the respective recesses on the bottom sides of the U-shaped profiled bodies 9. In order to avoid torques acting on the carrier with respect to its guiding direction, two respective drive elements 6 are arranged in opposed relationship with each other. In total, a large number of such pairs of drive elements 6 is provided along the longitudinal axis on the carrier 4 (double chamber arrangement). On the housing side, drive elements 11 are attached to the housing 5 such that they are disposed in opposed relationship with the drive elements 6 on the carrier side, also said drive elements 11 on the housing side being arranged in a regular mode of arrangement in the form of opposed pairs so that symmetry is obtained with regard to the longitudinal axis. The drive elements 11 on the housing side are implemented such that they fill almost the whole open area of the cross-sectional profile of the carrier 4, whereby a particularly compact structural design is obtained. Also as far as these drive elements on the housing side are concerned, a plurality of said drive elements is screwed to the inner wall of a respective housing plate along the longitudinal axis so that, when such a plate is removed, the drive elements 11 on the housing side can be removed simultaneously.

Figure 5B:
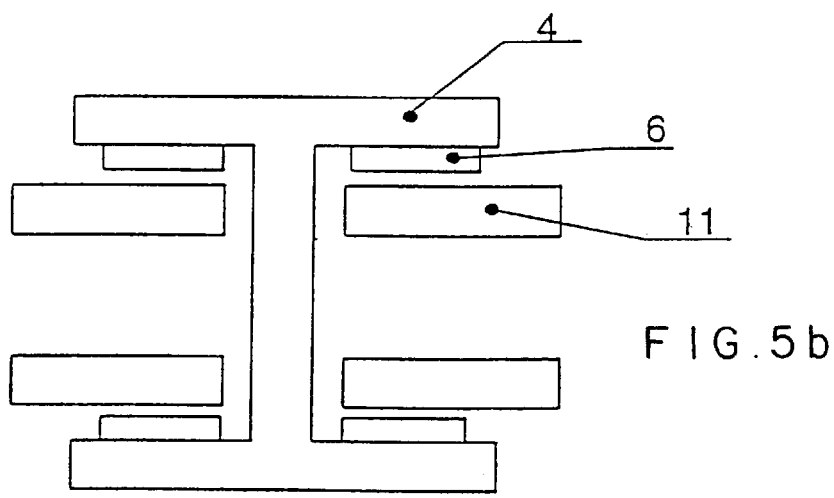
Figure 5C:
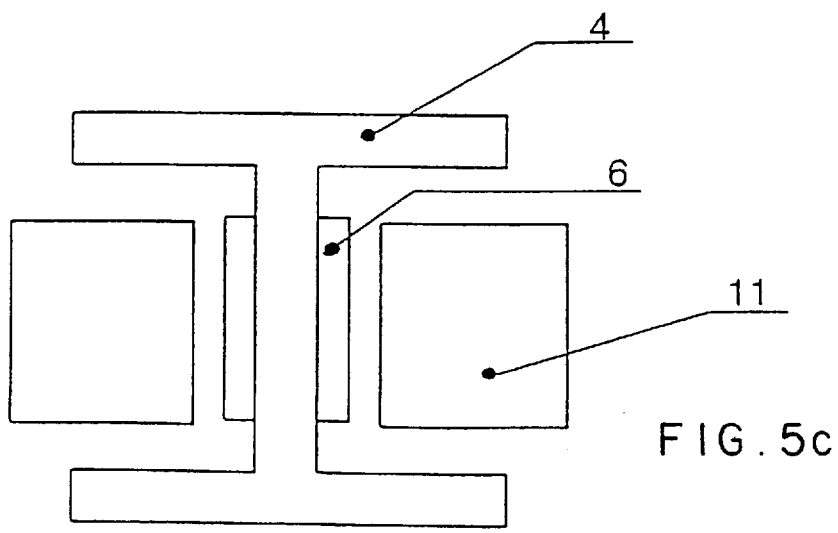

In the case of a further embodiment shown in FIG. 5b), the drive elements 6 on the carrier side are arranged on the inner sides of the outer legs of the double T cross-sectional profile. Also in this case, the respective opposed drive elements on the housing side project into the open area of the cross-section, i.e. between the legs of the double T-section. In the embodiment according to FIG. 5b), the carrier 4 can be guided on the housing 5 in the same way as in FIG. 4.

In a third embodiment, the drive elements 6 on the carrier side are arranged in respective opposed pairs on the outer sides of the outer legs of the double T-section. The guide means for the carrier 4 can here be provided in the open areas of the double T-section so as to realize a particularly compact structural design.

For a purposeful longitudinal adjustment of the linear drive, the position of the carrier 4 relative to the housing 5 must be detected. For this purpose, a linear measurement system is provided, which comprises a measuring head 13 attached to the housing 5 and located preferably on one end of the housing. In addition, the linear measurement system comprises marking means on the carrier, which are integrated in a guide rail, preferably the guide rail constituting the upper guide rail when the linear drive has been installed. Furthermore, safety elements are provided, which prevent the carrier 4 to be moved out of the housing 5 completely. These safety elements can be of an electrical as well as of a mechanical nature. In the embodiment shown, a limit switch 14 is shown at one end of the housing as a safety element, whereas a currentless operating safety means 15 is provided on the other end of the housing as a means preventing the carrier 4 from falling out.

The linear drive described can be used for a great variety of drive purposes, but primarily it is suitable to be used for drive axles of parallel structures such as hexapod structures.

What is claimed is:

1. A hexapod machine tool, comprising:
   (a) a support;
   (b) a plurality of adjustable-length angularly arranged struts (1) connected with said support, each of said struts including;
      (1) a housing (5) having a first end containing a chamber;
      (2) a tool carrier (4) connected for linear movement within said housing chamber, said carrier having a double-T cross-sectional profile; and
   (c) detecting means for detecting the position of said carrier relative to said housing, comprising:
      (1) mark means (12) carried by an outer side of said carrier; and
      (2) measuring head means (13) mounted on said housing opposite said mark means.

2. A hexapod machine tool as defined in claim 1, wherein said carrier comprises:
   (a) a pair of carrier bodies (9) each having a U-shaped cross sectional profile including a pair of parallel spaced web portions, and a base portion connecting said web portions, said bodies being arranged with said web portions adjacent and parallel with each other, and with said body web portions extending outwardly from said base portions, respectively; and
   (b) a lightweight supporting element (7) connected between said base portions.

3. A hexapod machine that as defined in claim 2, wherein said supporting element (7) contains a plurality of weight-reducing openings.

4. A hexapod machine tool, comprising:
   (a) a support;
   (b) a plurality of adjustable-length angularly arranged struts (1) connected with said support, each of said struts including:
      (1) a housing (5) having a first end containing a chamber;
      (2) a tool carrier (4);
      (3) guide means (8) connecting said carrier for linear movement within said housing chamber, said guide means including a fixed bearing on one side of said carrier, and a movable bearing on another side of said carrier; and
   (c) detecting means for detecting the position of said carrier relative to said housing, comprising:
      (1) mark means (12) carried by an outer side of said carrier; and
      (2) measuring head means (13) mounted on said housing opposite said mark means.

5. A hexapod machine tool as defined in claim 4, wherein said guide means includes profiled rail means arranged on the outer sides of said carrier.

6. A hexapod machine tool as defined in claim 5, wherein said profiled rail means are formed separately on said carrier.

7. A hexapod machine tool as defined in claim 4, wherein said mark means is mounted on said guide rail means.

8. A hexapod machine tool, comprising:
   (a) a support;
   (b) a plurality of adjustable-length angularly arranged struts (1) connected with said support, each of said struts including;
      (1) a housing (5) having a first end containing a chamber;
      (2) a tool carrier (4) connected for linear movement within said housing chamber;
   (c) detecting means for detecting the position of said carrier relative to said housing, comprising:
      (1) mark means (12) carried by an outer side of said carrier; and
      (2) measuring head means (13) mounted on said housing opposite said mark means.

9. A hexapod machine tool as defined in claim 8, and further including drive means (6,11) arranged within said housing chamber for displacing said tool carrier relative to said housing, said drive means including at least one first drive element (6) mounted on an inner surface of said tool carrier.

10. A hexapod tool machine as defined in claim 9, wherein a pair of said first drive elements are mounted on opposite sides of said tool carrier.

11. A hexapod tool machine as defined in claim 9, wherein said drive means includes a second drive element (5) connected with said housing opposite said first drive element.

12. A hexapod tool machine as defined in claim 8, wherein said tool carrier has in transverse cross-section a uniform polygonal configuration.

* * * * *